United States Patent Office 3,088,937
Patented May 7, 1963

3,088,937
COPOLYMERIZATION OF VINYLIDENE
CHLORIDE-VINYL CHLORIDE
Alexei Trofimow, Cambridge, and Philip K. Isaacs and Donald Goodman, Brookline, Mass., assignors to W. R. Grace & Co., Cambridge, Mass., a corporation of Connecticut
No Drawing. Filed Nov. 3, 1959, Ser. No. 850,527
10 Claims. (Cl. 260—87.7)

This invention relates to the copolymerization of vinylidene chloride and vinyl chloride. The present application is a continuation-in-part of application Serial No. 755,729, filed November 24, 1958, and now abandoned.

The properties of copolymers of vinylidene chloride and vinyl chloride are such that the copolymers (commonly called saran) are particularly suitable for a food wrap. Films formed of the copolymers are non-toxic, odorless, and have an inherent impermeability to water vapor and oxygen unmatched by any other commercial plastic material. For many wrapping operations, it is desirable to take advantage of the ability of these copolymers to be heat sealed and, when oriented, to be shrunken to give a "skin-tight" package for an object, e.g. a foodstuff.

In addition to these properties, a wrapping film should be clear, glossy, have a high tensile strength, and be stiff enough at room temperature to be handled on automatic wrapping machinery. Furthermore, it should be flexible at low temperatures, if it is to be used for frozen or refrigerated food.

The problem of combining the inherent advantages of saran, described above, with the general requirements of a packaging film just referred to is a difficult one. This is due to certain properties of the conventional vinylidene chloride-vinyl chloride polymerization systems. Furthermore, the very high density of saran (1.6 to 1.8) makes it imperative to use very thin films. The need for high tensile strength in such films is therefore apparent.

There are several standard methods utilized today in copolymerizing vinylidene chloride with vinyl chloride.

The most commonly employed method is to polymerize a single charge of between 65 and 75% vinylidene chloride and the balance vinyl chloride in one step until the desired conversion is reached. This is usually done in water emulsion with water soluble catalysts. This process is accompanied by a rise in pressure due to the more rapid utilization of vinylidene chloride as the faster reactive monomer, leaving an excess of unreacted vinyl chloride. The result is that a heterogeneous polymer is formed whose properties depend upon the degree of conversion. This invariably gives either a polymer with low shrinkability at low conversion, or a highly shrinkable but cloudy film at high conversion. Most standard emulsion methods also employ large amounts of emulsifiers which impart additional haze, extractables, and taste. The low tensile strength of these products is also a drawback.

Suspension polymerization is also often used. However, it results in low molecular weight polymers. High ratios of vinylidene chloride to vinyl chloride can be used in this procedure to give a film with good barrier properties. The low molecular weight, however, leads to brittleness at low temperatures, and, in the ratios where high shrink is obtained, poor extrusion properties.

Another method proposed is emulsion polymerization in two steps. Here, the object is to reduce the amount of very high vinyl chloride fraction in the copolymer formed from a batch process high conversion run, which gives a cloudy incompatible extruded film. By starting with a 50:50 vinylidene chloride/vinyl chloride ratio, carrying the reaction to 50% conversion, and adding more vinylidene chloride, a high shrink can be obtained without too much cloudiness. However, the melting point of such polymers is too high for easily fabricating, and the plasticizer compatibility is very limited. Plasticized films become cloudy due to the high vinylidene-chloride-containing fraction which is incompatible with plasticizer.

A further method which has been proposed is emulsion polymerization at constant monomer ratio. Here, the ratio of vinylidene to vinyl chloride is held constant by either bleeding off the slower reacting vinyl chloride or adding the faster reacting vinylidene chloride continuously. Although this type of a copolymer has a very homogeneous composition and is suitable for some applications, it has certain drawbacks when used as a heat shrinkable packaging film due to the high homogeneity. On heat sealing the film, either no seal is obtained, or at higher temperature, the entire film tends to melt and a very weak bond is obtained which cannot withstand the forces of heat shrinkage. The breakage problem is apparently due to a high degree of melting and deorientation adjacent to the seal. In shrinking this unoriented material is weaker and tends to come apart. Furthermore, the constant monomer ratio polymers have limited plasticizer compatibility, only 5 to 7% of the common commercial plasticizers can be held without ultimately exuding to the surface.

It is an object of the present invention to form vinylidene chloride-vinyl chloride copolymers which can be extruded into film of high tensile strength, high clarity and desirable heat shrinkage.

Another object is to provide a process for producing a novel copolymer of vinyl chloride and vinylidene chloride which can be made into films having good low temperature flexibility and yet which are stiff enough at room temperature for automatic handling.

It is a further object to produce such a copolymer for a packaging film that may be readily heat sealed to give a strong bond.

A still further object is to prepare such packaging films which will remain flexible and smooth and will not exude plasticizer on long storage, nor give off taste or odor.

Yet another object is to produce a vinylidene chloride-vinyl chloride copolymer having as high a chlorine content as possible for minimum vapor permeability while at the same time retaining good flexibility, good shrinkability and plasticizer compatibility.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained and the disadvantages of the prior art overcome by a combination of vinylidene chloride to vinyl chloride monomer control and proper emulsifier selection.

According to the invention, vinylidene chloride and vinyl chloride are polymerized in a ratio of 40 to 60% vinylidene chloride and 60 to 40% vinyl chloride, preferably 50% vinylidene chloride and 50% vinyl chloride in an aqueous emulsion to 40 to 90% conversion, preferably 60%. Then there is added a mixture containing 60 to 90% vinylidene chloride and 40 to 10% vinyl chloride, preferably 85% vinylidene chloride and 15% vinyl chloride and the process is continued until 80 to 95%, preferably 85%, overall conversion. This prevents the formation of a high vinyl chloride fraction in the end stages of the reaction and also prevents a high vinylidene chloride fraction from forming. From 20 to 50% of the total monomers are added initially and the balance in a second step. As a result, the problems of poor clarity, high melting point, plasticizer incompatibility and shrink control encountered in prior art processes are overcome.

The high clarity and tensile strength of the products obtained by the present invention are markedly increased by the use of a special class of emulsifiers in very low concentrations. As such emulsifiers there are used 0.1 to 1.0% of an emulsifier having at least 18 carbon atoms in a single alkyl or alkaryl group. These emulsifiers give a 30% increase in tensile strength as compared to the standard low chain length emulsifiers. The emulsifiers which can be employed include sodium dodecylbenzene sulfonate, sodium octadecylbenzene sulfonate, N-octadecyl disodium sulfosuccinamate, N-eicosanyl disodium sulfosuccinamate, potassium octadecyl benzene sulfonate, sodium oleyl sulfonate, sodium octadecyl sulfate, etc. These emulsifiers are relatively low in cost, have freedom from taste and are acceptable in food wraps.

Extrudability of the final copolymer is markedly affected by molecular weight. For example, too low a value, e.g. a molecular weight of about 50,000 gives a large belled bubble which is hardly manageable when extruded according to United States Patent No. 2,452,080. It has been found that the addition of a small amount of glycerine, e.g. 0.1 to 1% to the aqueous phase of the polymerization medium increases the molecular weight to 150,000 to 200,000. Such polymers give readily manageable bubbles in the extrusion process of United States Patent No. 2,452,080.

The polymerization is carried out using conventional catalysts, e.g. peroxides such as benzoyl peroxide, hydrogen peroxide, o,o'-dichlorobenzoyl peroxide, caproyl peroxide, caprylyl peroxide, pelargonyl peroxide, cumene hydroperoxide, tertiary butyl hydroperoxide, triisopropyl benzene hydroperoxide, tertiary butyl diperphthalate, tertiary butyl perbenzoate, sodium persulfate, ammonium persulfate, potassium persulfate, peracetic acid, azo compounds, e.g. azo-bis-isobutyronitrile, etc. Polymerization is preferably carried out at between about 20 and 40° C. and at a pH of 2.0 to 3.0. The reaction usually takes 7 to 10 hours. Coagulation is carried out with aluminum sulfate at 20–25° C. and the coagulant is washed and dried.

While not being limited to any theory, it is believed that there are several factors which are important in the emulsifying system. The high strength obtained is due to a more linear polymer formed from regular micelles which are produced by the long chain emulsifiers. Furthermore, the long chain on the emulsifying agent allows the use of very low concentrations since the critical micelle concentration is in the order of 0.05% in water. Short chain emulsifiers on the other hand must be used in higher concentrations to form micelles, and this affects the polymerization product adversely and also adds to the cost of the final polymer.

The products of the present invention on the other hand possess very high clarity, high strength, desirable heat shrinkage properties, perfect heat sealability, good low temperature properties, desirable stiffness at room temperature, impermeability to vapors and gases, and high plasticizer compatibility.

Unless otherwise indicated, all parts and percentages are by weight.

*Example 1*

Aqueous phase: Parts
    Demineralized water _____ 180
    Potassium persulfate _____ 0.10
    Sodium bisulfite _____ 0.05
    Nitric acid (69%) _____ 0.04
    Dodecyl benzene sodium
      sulfonate (Ultrawet K) _____ 0.5
    Glycerine _____ 0.5

The aqueous phase was loaded into a glass lined pressure reactor and deaerated. Then it was heated to 30° C. and a mixture of 16.5 parts of vinylidene chloride and 16.5 parts of vinyl chloride was added. (This was 33% of the total monomers eventually added.) The polymerization was allowed to proceed under the following conditions:

Temperature: 30° C. ±0.2° C.
Stirring rate: 175 to 200 r.p.m.
Pressure: 33 p.s.i. initially and rising gradually to 48 p.s.i.
Rate of polymer formation: 4 to 7% solids formed per hour At exactly 10% solids (60% conversion of the monomers) and at a pressure of 48 p.s.i. at 30° C., there was added a mixture of 57.0 parts of vinylidene chloride and 10.0 parts vinyl chloride. This brought the pressure down to 22 p.s.i. The reaction was allowed to continue until the overall conversion to polymer was about 85%. This corresponded to 33 to 35% solids. The reactor was vented, cooled to 20° C. and subjected to a 26 inch vacuum for 45 minutes to strip off the unreacted monomers. The resultant latex was coagulated with 0.5 part of aluminum sulfate based on total solids, the slurry heated to 60° C. for ½ hour to crystallize the particles for easy handling and then the mixture was centrifuged and washed with water to remove the emulsifier and catalyst. The crumbs were dried at 70° C. for 18 hours.

*Example 2*

This example was identical with Example 1 except that 0.5 part of N-octadecyl disodium sulfosuccinamate were employed in place of the dodecyl benzene sodium sulfonate.

Examples 3 and 4 illustrate the fact that the conditions recited above are critical. Thus, Table 1 shows that the films obtained using the products of Examples 3 and 4 are deficient in one or more aspects.

*Example 3*

This example was identical with Example 1 except that 3 parts of dihexylsodium sulfosuccinate were used as an emulsifier in place of the 0.5 part of dodecyl sodium sulfonate.

*Example 4*

This example was identical with Example 1 except that all the monomer was added as a single charge containing 68 parts of vinylidene chloride and 32 parts of vinyl chloride.

The products of the present invention as made by Examples 1 and 2 were free-flowing pure white powders having the following properties:

Bulk density_____ 0.40 to 0.50.
Actual density_____ 1.65 to 1.70.
Percent chlorine in polymer_____ 70 to 71.
Percent bound vinylidene chloride__ 82 to 86.
Melting range_____ 126 to 141° C.
Odor_____ None.
Taste_____ None.
Molded platen_____ clear, slightly yellowish.

The advantages of the products of the present invention over those produced by prior art methods are illustrated in Table 1 where the properties of extruded films made from the products are listed. In all cases, the polymers were blended with 7% dibutyl sebacate as a plasticizer and 0.3% tetrasodium pyrophosphate as a stabilizer and then extruded into biaxially oriented film as described in United States Patent No. 2,452,080.

alkyl group in a first stage until 60% conversion of monomers, then in a second stage adding a mixture containing 85% vinylidene chloride and 15% vinyl chloride and continuing the polymerization until 85% overall monomer conversion is attained, 33% of the total monomers being added in the first stage and the balance being added in the second stage, all percentages expressed herein being

| Polymer | Vinylidene Chloride Content, Percent | Tensile Strength × 1,000 p.s.i. | Modulus, 1,000 p.s.i. | | Clarity | | Shrink at 205° F., Percent | Plasticizer Compatability Percent | Heat Seal |
|---|---|---|---|---|---|---|---|---|---|
| | | | At 74° F. | At 10° F. | Haze, Percent | Diffuse Reflectivity, Percent | | | |
| Example 1 | 85 | 15-16 | 28-32 | 250-300 | 1-2 | 0.5-0.8 | 50-55 | 15+ | Good. |
| Example 2 | 85 | 15-16 | 28-32 | 250-300 | 2-4 | 0.5-0.8 | 50-55 | 15+ | Good. |
| Example 3 | 85 | 11-13 | 20-25 | 200-250 | 1-2 | 0.5-0.8 | 50-55 | 15+ | Good. |
| Example 4 | 70 | 12-13 | 20-25 | 350-400 | 6-13 | 1-3 | 55-60 | 15+ | Good. |
| Commercial One Step Emulsion Polymer | 70 | 7-10 | 16-20 | 350-450 | 6-13 | 1-3 | 55-60 | 15+ | Good. |
| Commercial Suspension Polymer | 91 | 16-20 | 45-70 | 700-900 | 1-2 | 0.5-0.8 | 5-15 | 5 | Fair. |
| Emulsion Polymer Using Constant Monomer Ratio | 80 | 10-12 | 16-20 | 200-250 | 1-2 | 0.5-0.8 | 60-70 | 5 | Poor. |

It is evident from the table that Example 3, utilizing a short chain emulsifier, does not yield a film having a maximum strength. Example 4 gives a film product having unduly high haze and also having somewhat inferior modulus properties to those of Examples 1 and 2.

What is claimed is:

1. A process comprising copolymerizing 40 to 60% of vinylidene chloride and 60 to 40% of vinyl chloride in an aqueous emulsion including a polymerization catalyst, 0.1 to 1% of glycerine, and 0.1 to 1% of emulsifier selected from the group consisting of long chain alkyl and alkaryl sulfates and sulfonates having a chain of 12 to 20 carbon atoms in the alkyl group in a first stage until 40 to 90% conversion of monomers has taken place, then in a second stage adding a mixture containing 60 to 90% vinylidene chloride and 40 to 10% vinyl chloride and continuing the polymerization until 80 to 95% overall monomer conversion is attained, from 20 to 50% of the total monomers being added in the first stage and the balance being added in the second stage, all percentages expressed herein being based on the total weight of the monomers.

2. A process according to claim 1 wherein the emulsifier is sodium dodecyl benzene sulfonate.

3. A process according to claim 1 wherein the emulsifier is N-octadecyl disodium sulfosuccinamate.

4. A process comprising copolymerizing 50% vinylidene chloride with 50% vinyl chloride in an aqueous emulsion including a polymerization catalyst, 0.1 to 1% of glycerine, and 0.1 to 1% of an emulsifier selected from the group consisting of long chain alkyl and alkaryl sulfates and sulfonates having a chain of 12 to 20 carbon atoms in the alkyl group in a first stage until 60% conversion of monomers, then in a second stage adding a mixture containing 85% vinylidene chloride and 15% vinyl chloride and containing the polymerization until 85% overall monomer conversion is attained, 33% of the total monomers being added in the first stage and the balance being added in the second stage, all percentages expressed herein being based on the total weight of the monomers, the entire polymerization being carried out at a temperature of about 30° C.

5. A process according to claim 4 wherein the emulsifier is sodium dodecyl benzene sulfonate used in an amount of 0.5%.

6. A process according to claim 4 wherein the emulsifier is sodium dodecyl benzene sulfonate.

7. A process according to claim 4 wherein the emulsifier is selected from the group consisting of sodium dodecylbenzene sulfonate, sodium octadecylbenzene sulfonate, N-octadecyl disodium sulfosuccinamate, N-eicosanyl disodium sulfosuccinamate, potassium octadecyl benzene sulfonate, sodium oleyl sulfonate and sodium octadecyl sulfate.

8. A copolymer of vinyl chloride and vinylidene chloride having a bulk density of 0.40 to 0.50; an actual density of 1.65 to 1.70; a percent chlorine of 70-71%; bound vinylidene chloride of 82-86%; melting range 126-141° C.; tensile strength 15,000-16,000 p.s.i.; modulus at 74° F. of 28,000-32,000 p.s.i.

9. A process according to claim 4 wherein the emulsifier is N-octadecyl disodium sulfosuccinamate.

10. A process according to claim 1 wherein the entire reaction is carried out at a pH between about 2 and 3 and a temperature between about 20° C. to 40° C.

References Cited in the file of this patent

UNITED STATES PATENTS

| | | |
|---|---|---|
| 2,475,016 | De Nie | July 5, 1949 |
| 2,640,050 | Le Fevre et al. | May 26, 1953 |